(12) United States Patent
Abrahamsson et al.

(10) Patent No.: US 7,009,935 B2
(45) Date of Patent: Mar. 7, 2006

(54) TRANSMISSION OVER PACKET SWITCHED NETWORKS

(75) Inventors: Tina Abrahamsson, Stockholm (SE); Soren Vang Andersen, Stockholm (SE); Roar Hagen, Stockholm (SE); W. Bastiaan Kleijn, Stocksund (SE)

(73) Assignee: Global IP Sound AB, Stockholm (SE)

( * ) Notice: Subject to any disclaimer, the term of this patent is extended or adjusted under 35 U.S.C. 154(b) by 948 days.

(21) Appl. No.: 09/852,939

(22) Filed: May 9, 2001

(65) Prior Publication Data

US 2001/0040871 A1    Nov. 15, 2001

(30) Foreign Application Priority Data

May 10, 2000    (SE) ..................................... 0001727

(51) Int. Cl.
*H04L 12/28* (2006.01)
*H04L 12/66* (2006.01)
*G10L 21/00* (2006.01)

(52) U.S. Cl. ...................... 370/228; 370/352; 370/401; 704/270

(58) Field of Classification Search ........ 370/228–352, 370/386–401, 463–477; 704/201–229, 500–503, 704/270–272; 375/222–245, 252–259; 341/50–76, 341/107–200
See application file for complete search history.

(56) References Cited

U.S. PATENT DOCUMENTS

| | | | | |
|---|---|---|---|---|
| 6,415,254 | B1 * | 7/2002 | Yasunaga et al. | 704/223 |
| 6,477,501 | B1 * | 11/2002 | Heo | 704/503 |
| 6,546,370 | B1 * | 4/2003 | Heo | 704/500 |
| 6,611,212 | B1 * | 8/2003 | Craven et al. | 341/50 |
| 6,664,913 | B1 * | 12/2003 | Craven et al. | 341/200 |
| 6,774,820 | B1 * | 8/2004 | Craven et al. | 341/50 |
| 6,784,812 | B1 * | 8/2004 | Craven et al. | 341/50 |
| 2001/0005365 | A1 * | 6/2001 | Attimont et al. | 370/352 |
| 2001/0012993 | A1 * | 8/2001 | Attimont et al. | 704/200.1 |
| 2003/0167170 | A1 * | 9/2003 | Andrsen et al. | 704/270 |
| 2005/0007262 | A1 * | 1/2005 | Craven et al. | 341/50 |

* cited by examiner

*Primary Examiner*—Man U. Phan
(74) *Attorney, Agent, or Firm*—Townsend and Townsend and Crew LLP

(57) ABSTRACT

The invention relates to methods for encoding/decoding a digitized sound signal which is transmitted over a packet switched network in such a way that diversity is provided. Each sound segment of the digitized sound signal is encoded into at least two different segment descriptions, i.e. into different representations of the sound signal segment. The segment descriptions differ from each other in that they provide different quantization values for a digital sound signal sample. The different segment descriptions are transmitted in separate data packets over the network at different points of time.

20 Claims, 10 Drawing Sheets

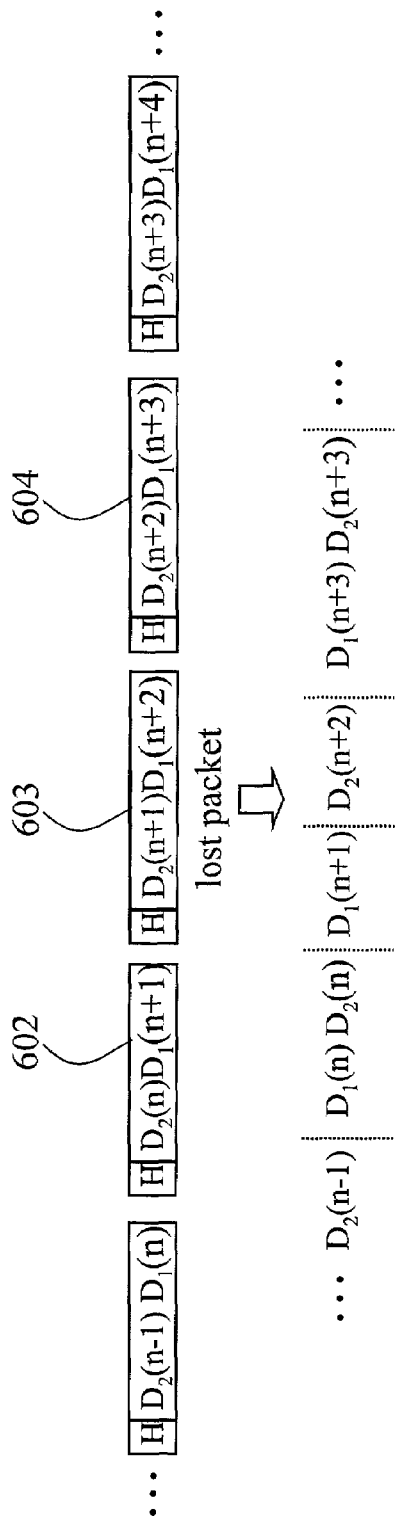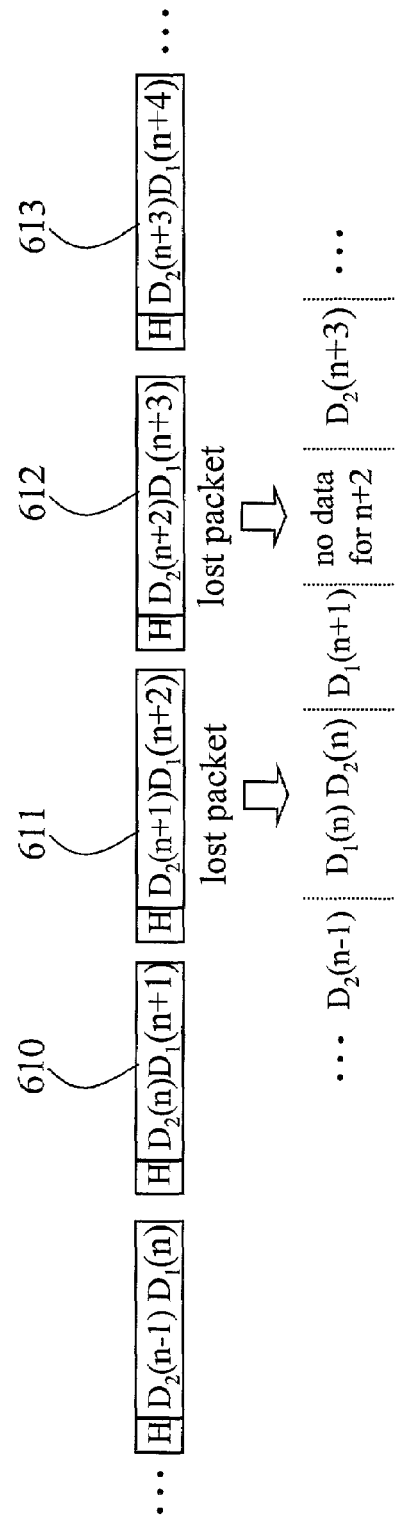

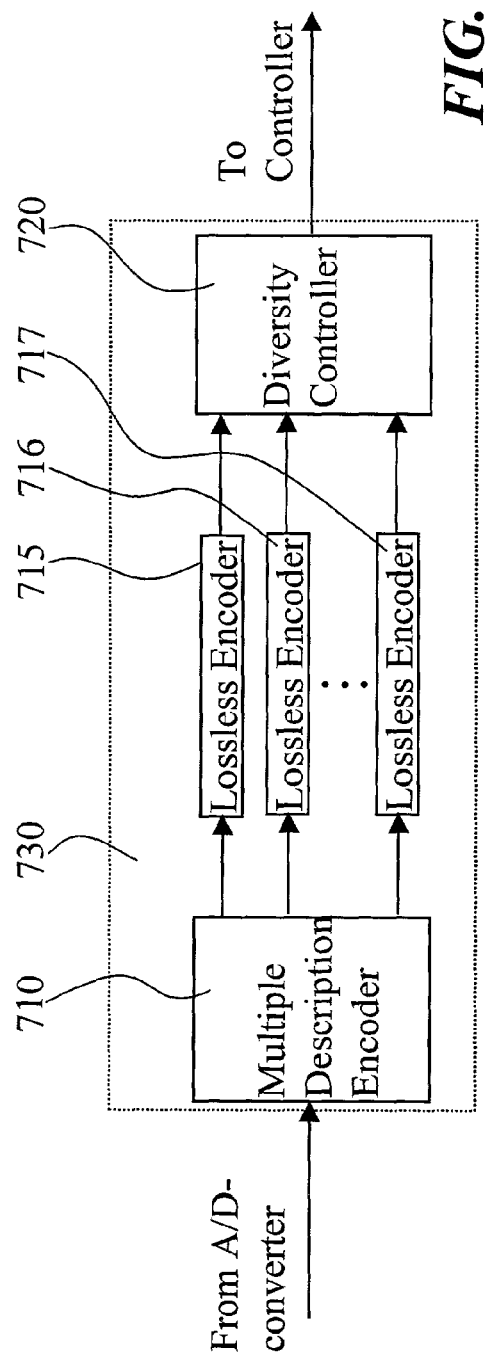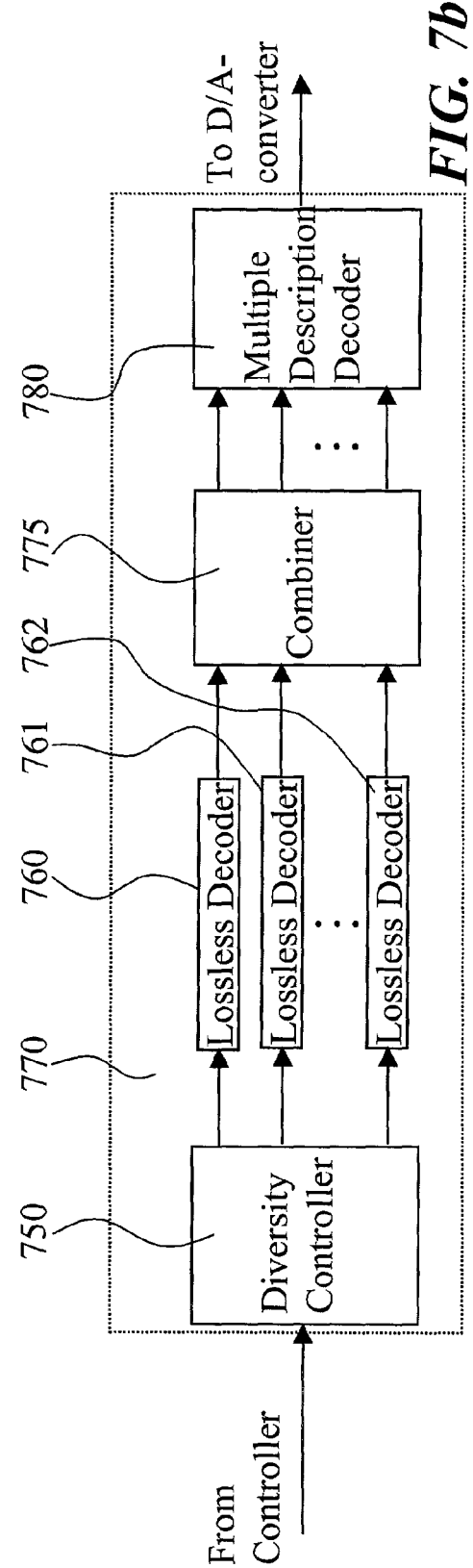

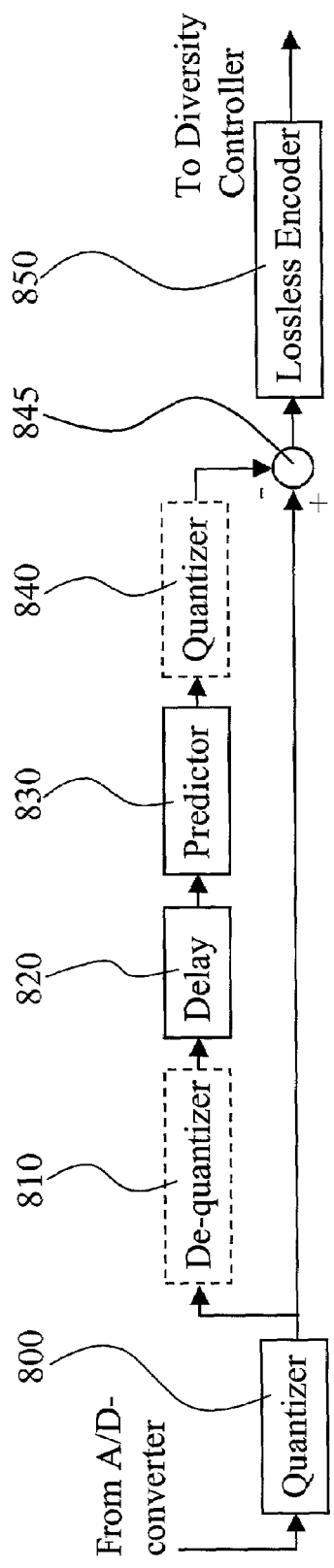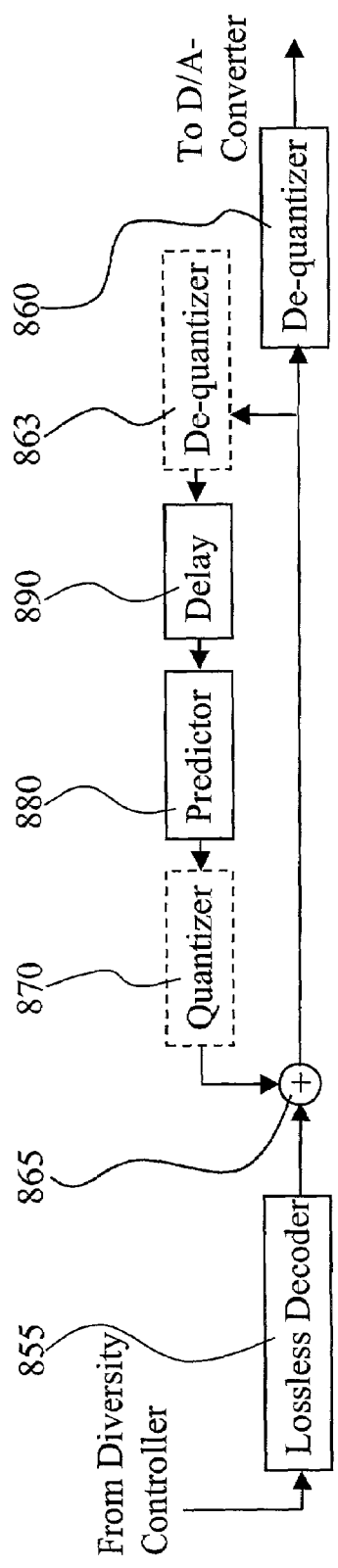

TRANSMISSION OVER PACKET SWITCHED NETWORKS

This application claims foreign priority to Swedish Application Ser. No. SE 0001727-7 filed on May 10, 2000.

CROSS-REFERENCES TO RELATED APPLICATIONS

This application is related to U.S. patent application Ser. No. 09/853,883, entitled "ENCODING AND DECODING OF A DIGITAL SIGNAL", which is incorporated herein by reference.

TECHNICAL FIELD OF THE INVENTION

The present invention relates to encoding of a digitized sound signal and transmission of the coded digitized sound signal over a packet switched network, the encoding and transmission being performed in such a way that diversity is provided. More specifically, the present invention further relates to reception of data packets and decoding of its content to retrieve the originally transmitted digitized sound signal, the decoding being performed in such way that the diversity provided by the received packets is utilized.

BACKGROUND OF THE INVENTION

Telephony over packet switched networks, such as IP (Internet Protocol) based networks (mainly the Internet or Intranet networks) has become increasingly attractive due to a number of features. These features include such things as relatively low operating costs, easy integration of new services, and one network for voice and data. The speech or audio signal in packet switched systems is converted into a digital signal, i.e. into a bitstream, which is divided in portions of suitable size in order to be transmitted in data packets over the packet switched network from a transmitter end to a receiver end.

Packet switched networks were originally designed for transmission of non-real-time data and voice transmissions over such networks causes some problems. Data packets can be lost during transmission, as they can be deliberately discarded by the network due to congestion problems or transmission errors. In non-real-time applications this is not a problem since a lost packet can be retransmitted. However, retransmission is not a possible solution for real-time applications. A packet that arrives too late to a real-time application cannot be used to reconstruct the corresponding signal since this signal already has been, or should have been, delivered to the receiving speaker. Therefore, a packet that arrives too late is equivalent to a lost packet.

One characteristic of an IP-network is that if a packet is received the content of packet is necessarily undamaged. An IP-packet has a header which includes a CRC (Cyclic Redundancy Check) field. The CRC is used to check if the content of the packet is undamaged. If the CRC indicates an error, the packet is discarded. In other words, bit errors do not exist, only packet losses.

The main problem with lost or delayed data packets is the introduction of distortion in the reconstructed speech or audio signal. The distortion results from the fact that signal segments conveyed by lost or delayed data packets cannot be reconstructed. The speech coders in use today were originally designed for circuit switched networks with error free channels or with channels having bit-error characteristics. Therefore, a problem with these speech coders is that they do not handle packet losses well.

Considering what has been described above as well as other particulars of a packet switched network, there are problems connected with how to provide the same quality in telephony over packet switched networks as in ordinary telephony over circuit switched networks. In order to solve these problems, the characteristics of a packet switched network have to be taken into consideration.

In a system that transmits data over packet switched networks, one or more headers are added to each data packet. These headers contain data fields with information about the destination of the packet, the sender address, the size of the data within the packet, as well as other packet transport related data fields. The size of the headers added to the packets constitutes overhead information that must be taken into account. To keep the packet assembling delay of data packets small, the payload of the data packets have limited size. The payload is the information within a packet which is used by an application. The size of the payload, compared to the size of the actually transmitted data packet with its included overhead information, is an important measure when considering the amount of available bandwidth. A problem with transmitting several relatively small data packets, is that the size of the headers will be substantial in comparison with the size of the information which is useful for the application. In fact, the size of the headers will not seldom be greater than the size of the useful information.

To alleviate bandwidth problems, it is desirable to reduce the bit rate by suitable coding of the information to be transmitted. However, the advantage of the bit rate reduction by coding is less significant, and the bandwidth still a problem, if a very large overhead in the form of a header is added to the application information before transmission of the data packet.

One scheme frequently used for reducing the bit rate is to code information data using predictions of the data. These predictions are generated based on previous information data of the same information signal. However, due to the phenomenon that packets can be lost during transmission, it is not a good idea to insert dependencies between different packets. If a packet is lost and the reconstruction of a following information segment is dependent on the information contained in the lost packet, then the reconstruction of the following information segment will suffer. It is important that this type of error propagation is avoided. Therefore, the ordinary way of using prediction to reduce the bit rate of a speech or audio signal is not efficient for these kinds of transmission channels, since such prediction would lead to error propagation. Thus, there is a problem in how to provide prediction in a packet switched system when transmitting data packets with voice or audio signal information.

In order to overcome the problems associated with lost or delayed data packets during real-time transmissions, it is suitable to introduce diversity for the transmission over the packet switched network. Diversity is a method which increases robustness in transmission by spreading information in time (as in interleaving in mobile telephony) or over some physical entity (as when using multiple receiving antennas). In packet transmission for one embodiment, diversity is introduced on a packet level by finding some way to create diversity between packets. The simplest way of creating diversity in a packet switched network is to transmit the same packet payload twice in two different packets. In this way, a lost or delayed packet will not disturb the transmission of the payload information since another packet with identical payload, most probably, will be received in due time. A disadvantage with this is that it is not very efficient in terms of bandwidth since the network or channel is loaded with twice the amount of information.

An example of the use of diversity for decreasing the impact of packet loss on audio quality in Internet telephony applications is disclosed by Bolot, S. et. al. in "Adaptive FEC-Based Error Control for Interactive Audio in the Internet", IEEE Infocom '99, New York, USA, March 1999. Bolot describes how Forward Error Correction (FEC) schemes are used for creating diversity. In these FEC schemes, a redundant version of an audio packet is transmitted along with the original information of a later packet. If a packet with original information is lost, the redundant information in a later packet can be used for partly reconstructing the samples representing the original information. This is achieved by coding the signal with a low rate coder (much lower rate than the original coder) and transmitting this lower rate signal as redundant information. There are however a number of disadvantages with this solution. The complexity of the coding system will be increased since an additional and different coding scheme will be needed for the redundant information. Also, the coder will be more hardware demanding in order to give reasonable quality at the lower rate. Furthermore, the receiving end will correspondingly need two different types of decoders, and, in case of packet loss, to be able to seamlessly reproduce speech based on interleaved information from the two different types of decoders.

The above-mentioned diversity schemes or diversity systems have the disadvantage that the transmission of a sound signal does not benefit from the additional bandwidth needed by the transmitted redundant information under normal operating conditions. Thus, for most of the time, when there are no packet losses or delays, the additional bandwidth will merely be used for transmission of overhead information.

Since bandwidth most often is a limited resource, it would be desirable if a transmitted sound signal somehow could benefit from the additional bandwidth required by a diversity system. In one embodiment, it would be desirable if the additional bandwidth could be used for improving the quality of the decoded sound signal at the receiving end.

In "Design of Multiple Description Scalar Quantizers", V. A. Vaishampayan, IEEE Transactions on Information Theory, Vol. 39, No. 3, May 1993, the use of multiple descriptions in a diversity system is disclosed. The encoder sends two different descriptions of the same source signal over two different channels, and the decoder reconstructs the source signal based on information received from the channel(s) that are currently working. Thus, the quality of the reconstructed signal will be based on one description if only one channel is working. If both channels work, the reproduced source signal will be based on two descriptions and higher quality will be obtained at the receiving end. In the article, the author addresses the problem of index assignment in order to maximize the benefit of multiple descriptions in a diversity system.

In EP 0 856 956 A1, a multiple description coding communication system for image coding is disclosed. The invention uses transform coding where pairs of coefficients are transformed with a pairing transform to get a new pair of coefficients with substantially equal energy. These coefficients are coded separately and transmitted in different packets. In this way, information of both the original coefficients are in both packets and robustness to loss of one packet is obtained since the inverse pairing transform will produce two coefficients from one received, however with less resolution. A disadvantage with this system is that the efficiency will be low since two different types of quantizers are used to complement each other for redundancy purposes only, and not for improving the image quality when receiving both coefficient pairs.

Thus, in connection with transmission of a sound signal over a packet switched network, the problem to be solved is how to implement a diversity system that uses multiple description, provides good operating characteristics, is bandwidth efficient, and keeps the complexity low.

BRIEF DESCRIPTION OF THE DRAWINGS

Features and advantages of the invention will become readily apparent from the appended claims and the following detailed description of a number of exemplifying embodiments of the invention when taken in conjunction with the accompanying drawings in which like reference characters are used for like features, and wherein:

FIG. 4b shows an overview of the receiving part of a system for transmission of sound over a packet switched network in accordance with an embodiment of the present invention corresponding to that referred to in FIG. 4a;

FIGS. 6a and 6b show the consequences of two respective packet loss situations in the embodiment referred to by FIG. 5;

FIGS. 7a and 7b show overviews of the transmitting part and the receiving part, respectively, of a system for transmission of sound over a packet switched network in accordance with yet another embodiment of the present invention;

FIGS. 8a and 8b show overviews of lossless encoding of a description in a Multiple Description Encoder at a transmitting part and of lossless decoding of a description in a Multiple Description Decoder at a receiving part, respectively, according to an embodiment of the invention.

DESCRIPTION OF THE SPECIFIC EMBODIMENTS

Figure 1:
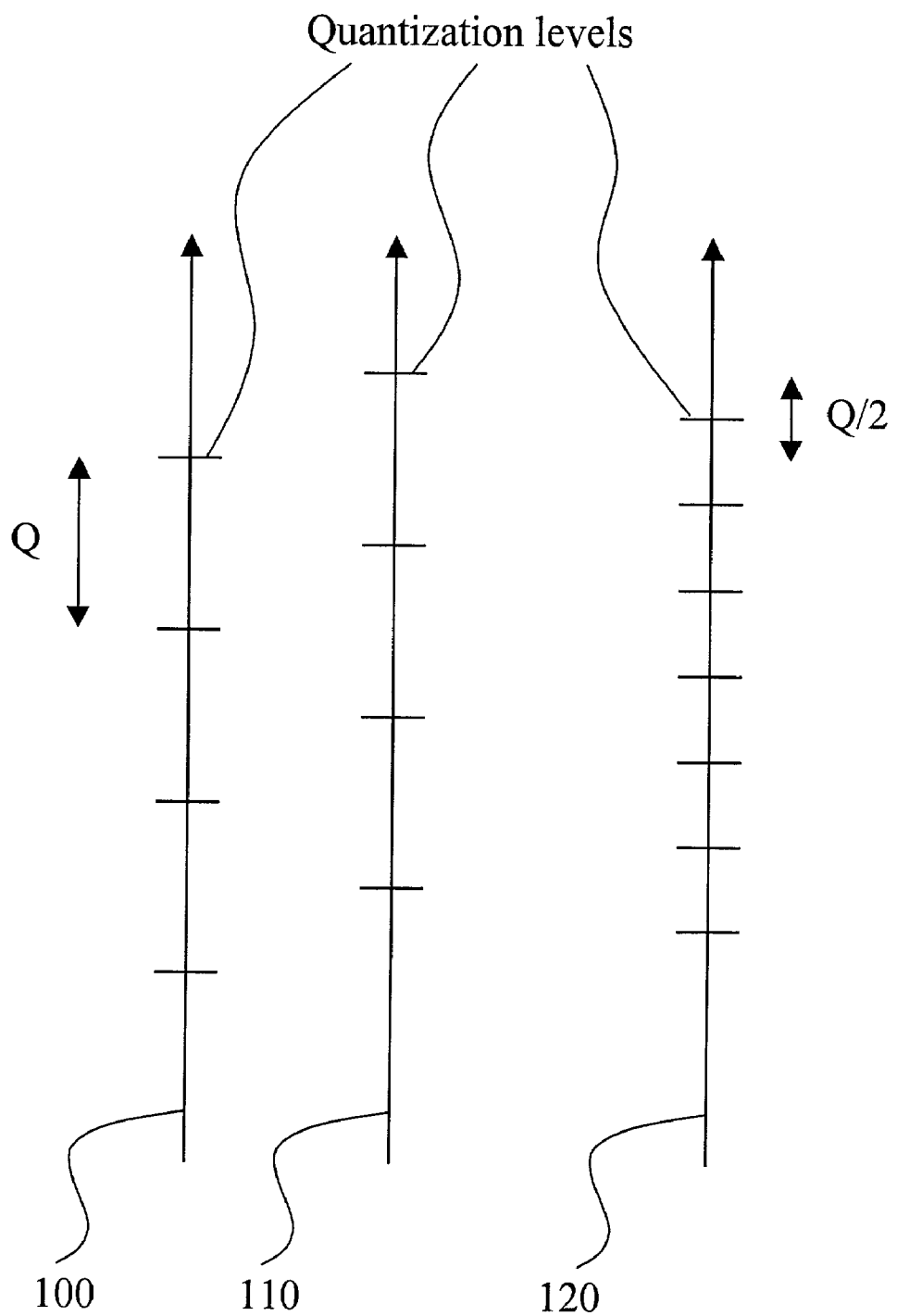
FIG. 1 shows one exemplifying way of realizing multiple descriptions in accordance with state of the art.

The present invention overcomes the problems of lost, discarded or delayed data packets during transmission of real time communication over a packet switched network. The present invention also provides an improved method for facilitating diversity transmission over a packet switched network when using multiple description coding of a speech or audio signal to be transmitted.

Further, the present invention combines diversity transmission over a packet switched network with the use of several different descriptions of a speech or audio signal. Thus, the diversity provided is not implemented by way of transferring purely redundant information, but instead by transferring several (two or more) representations of the same information. The diversity reduces the distortions due to packet loss or delay since each description gives a good basis for the reproduction of the speech/audio signal. Moreover, when all packets reach a receiver's end without loss/delay, the different representations are merged together before reproducing the speech/audio signal, thereby providing an improved quality of the reproduced speech/audio signal. The diversity provided is a time diversity achieved by transmitting different encoded segment descriptions of one and the same sound segment in different packets at different points in time, and by decoding a sound segment at a receiving end based on those segment description that were received within a predetermined time interval.

According to the present invention, a number of different sound encoders and corresponding sound decoders are provided for coding/decoding of a digitized sound signal. These sound encoders/decoders, described in different embodiments of the invention, operate with multiple descriptions in such way that an efficient diversity transmission of information between a transmitting end and a receiving end is obtained.

In the present invention, a multiple description encoder/decoder is an encoder/decoder which generates/receives at least two descriptions of a signal. The different descriptions are derived by the multiple description encoder by encoding of digital signal samples. The term segment description herein denotes the description of a sound signal segment as it is encoded by the multiple description encoder in accordance with the definition of one of the descriptions. Furthermore, the term digital signal sample is herein meant to be interpreted as either the actual sample or as any form of representation of the signal obtained or extracted from one or more of its samples.

According to a first aspect of the invention, a method is provided for encoding a digitized sound signal and transmitting the coded digitized sound signal over a packet switched network in such way that diversity is provided. At the transmitting end, a sound segment of the digitized sound signal is encoded into at least two different segment descriptions, i.e. into different representations of the sound signal segment. The segment descriptions differ from each other in that they provide different quantization values for a digital sound signal sample. The different segment descriptions are then transmitted in separate data packets at different points of time.

Consequently, according to a second aspect, a method is provided for receiving and decoding a coded digitized sound signal from a packet switched network in such way that the diversity provided by the received packets is utilized. At the receiving end, a decoder waits a predetermined time period for reception of a number of packets with respective segment descriptions of a sound segment. The sound segment of the digitized sound signal is then decoded based on a merger of those segment descriptions that were received within the predefined time interval. If only one segment description was received, the sound segment is decoded based on that single segment description. The sound segment will then still be reproduced with a quality that is sufficiently high.

Thus, diversity is provided from multiple descriptions by transmitting/receiving different individual segment descriptions of the same sound segment in different data packets at different time instances. These time instances being chosen in a controlled manner. This so-called time diversity provided by the controlled delay between the time instances and, thus, between the segment descriptions, is helpful when a time localized bottleneck occurs in the packet switched network, since the chance of receiving at least one of the segment descriptions of a certain sound segment increases when the different segment descriptions are transmitted at different points in time in different packets. In one embodiment, the time instances are chosen in such a way that a predefined time interval between the transmissions of two individual segment descriptions of the same sound segment is introduced.

According to the invention, the diversity can be enhanced by also transmitting individual segment descriptions of the same sound segment over different paths in the packet switched network, thereby combining time diversity with path diversity.

Segment descriptions of different descriptions of the sound signal and relating to different sound segments are grouped together in the same packet. At least two consecutive sound segments are represented by individual segment descriptions from different descriptions of the sound signal. This avoids the extra overhead required by the headers of the packets that transfer the different segment descriptions for one and the same sound segment, while still only one segment description of a specific sound segment is lost or delayed when a packet is lost or delayed.

According to the invention the digitized sound signal is optionally an n-bit PCM encoded sound signal. In one embodiment, a 64 kbit/s PCM signal in accordance with the standard G.711. The n-bit PCM encoded signal description is transcoded by a multiple description encoder to at least two descriptions using fewer than n bits for its representation, e.g., two (n−1)-bit representations, three (n−1)-bit representations or four (n−2)-bit representations. At the receiver end, a multiple description decoder transcodes the received descriptions back to a single n-bit PCM encoded sound signal. The transcoding corresponds to a translation between a code word of one description and respective code words of at least two different descriptions. By transcoding the PCM coded signal into multiple descriptions, there is no need to first decode and then recode the PCM coded signal to be able to provide multiple descriptions.

Lossless encoding/decoding is performed for each different segment description individually. This will reduce the bit rate needed for the multiple descriptions that are transmitted. Furthermore, individual predictors of the same type are used for the different descriptions at the transmitting and the receiving end, respectively. This eliminates the problem of lost synchronization between a predictor in the encoder and a predictor in the decoder which otherwise can occur if a packet with a segment description is lost when using a single predictor for the lossless encoding/decoding at the transmitting/receiving end.

Furthermore, the predictor state of each predictor is set to zero when generating prediction samples during lossless encoding/decoding of a beginning of a sound segment. In this way error propagation over sound segment boundaries is avoided. In general, the generation of a prediction sample during the lossless encoding/decoding operation is based on one ore more quantized digital sound samples.

It is to be understood that the term digital signal sample used herein is meant to be interpreted as either the actual sample or as any form of representation of the signal obtained or extracted from one or more of its samples. Also, a prediction sample is meant to be interpreted as either a prediction of an actual digital signal sample or as any form of prediction of a representation obtained or extracted from one or more of the digital signal samples.

In FIG. 1, one exemplifying way of realizing multiple descriptions of a source signal, such as a sound signal, is illustrated. This approach is known in the art and is one example of multiple descriptions that can be used by the present invention. However, other suitable ways of implementing multiple descriptions may equally well be used together with the present invention. In FIG. 1, the quantization levels of two different descriptions 100, 110 from two corresponding quantizers are shown. As illustrated, both descriptions have the same quantization step size Q, but description 110 has quantization levels that are shifted with half of the quantization step size Q with respect to the quantization levels of description 100. From these two descriptions 100 and 110, a combination leads to a combined description 120 with finer quantization step size Q/2. Using the two coarse quantizers, a bit rate of 2R is required to match the performance of a single fine quantizer with bit rate R+1. For example, if each description 100 and 110 has 4 quantization levels, each will require 2 bits to code these levels, i.e. a total of 4 bits. If a finer quantizer would be used for the combined description 120, the 7 quantization levels would require 3 bits when coded. For high R, this will constitute a significant increase of the bit rate when using two coarse quantizers for providing multiple descriptions instead of one finer quantizer providing a single description.

Figure 2:
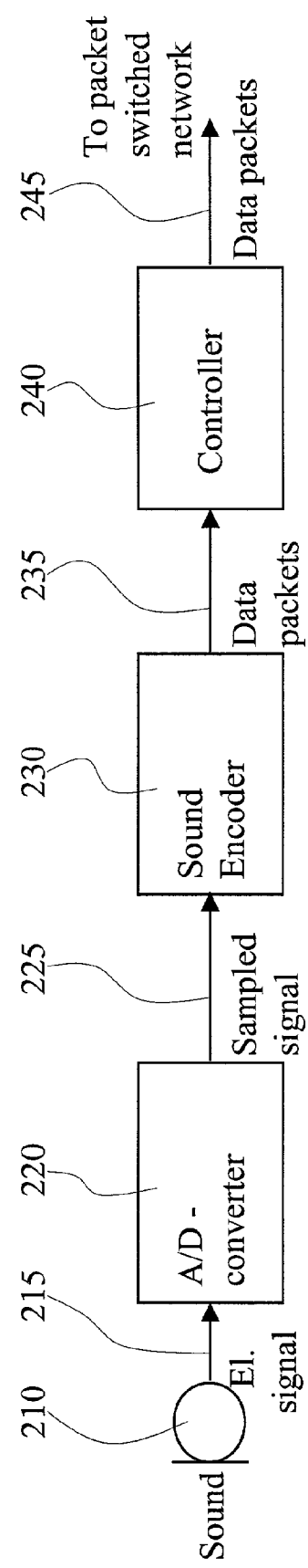
FIG. 2 shows an overview of the transmitting part of a system for transmission of sound over a packet switched network.

In FIG. 2 a block diagram of the transmitting part of a system for transmission of sound over a packet switched network is shown. The sound is picked up by a microphone 210 to produce an analog electric signal 215, which is sampled and quantized into digital format by an A/D converter 220. The sampling rate of the sound signal is dependent on the source of the sound signal and the desired quality. Typically, the sampling rate is 8 or 16 kHz for speech signals, and up to 48 kHz for audio signals. The quality of the digital signal is also affected by the accuracy of the quantizer of the A/D converter. For speech signals the accuracy is usually between 8 and 16 bits per sample. In a typical system, the transmitting end includes a Sound Encoder 230 in order to compress the sampled digital signal further. According to the present invention, an additional purpose of the Sound Encoder 230 is to modify the representation of the sound signal before transmission, with the intent to increase the robustness against packet losses and delays in the packet switched network. The sampled signal 225 is input to the Sound Encoder 230 which encodes the sampled signal and packetizes the obtained encoded signal into data packets. The data packets 235 are then transferred to a Controller 240 which adds sequencing and destination address information to the data packets, in order to make the packets suitable for transmission over a packet switched network. The data packets 245 are then transmitted over the packet switched network to a receiver end.

Figure 3:
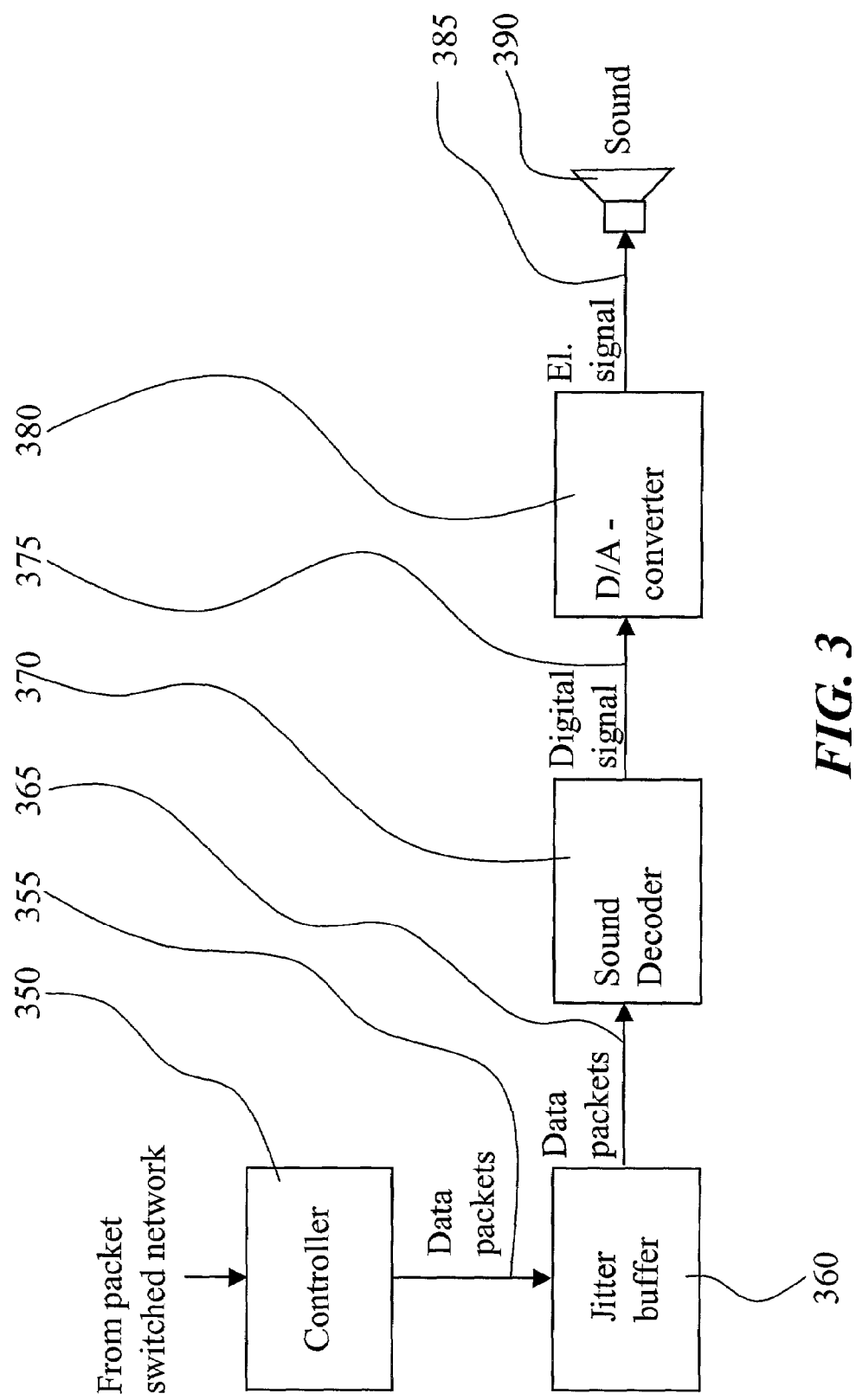
FIG. 3 shows an overview of the receiving part of a system for transmission of sound over a packet switched network.

In FIG. 3 a block diagram of the receiving part of a system for transmission of sound over a packet switched network is shown. A Controller 350 receives data packets from the packet switched network, strips addressing information and places the data packets 355 in a Jitter buffer 360. The Jitter buffer 360 is a storage medium, typically RAM, which regulates the rate by which data packets 365 exit the Jitter buffer 360. The physical capacity of the Jitter buffer is such that incoming data packets 355 can be stored. Data packets 365 which exit the Jitter buffer 360 are inputted to a Sound Decoder 370. The Sound Decoder 370 decodes the information in the data packets into reproduced samples of a digital sound signal. The digital signal 375 is then converted by a D/A-converter 380 into an analog electric signal 385, which analog signal drives a sound reproducing system 390, for example, a loudspeaker to produce sound at the receiver end.

As described earlier, the Sound Encoder 230 of the present invention is designed so as to modify the representation of the sound signal before transmission in order to increase the robustness against packet losses and delays, as well as reducing the bit rate, in the packet switched network. Consequently, the Sound Decoder 370 at the receiving end is designed to decode this modified representation. The present invention uses multiple descriptions for representing the sound signal. Therefore, the Sound Encoder 230 includes a Multiple Description Encoder and, consequently, the Sound Decoder 370 includes a Multiple Description Decoder. The design and operation of the Sound Encoder 230 and the Sound Decoder 370, in accordance with an embodiment of the invention, will now be described in greater detail with reference to FIGS. 4a and 4b. Apart from what is being described below with respect to the sound encoding/decoding blocks, the overall operation correspond to that previously described with reference to FIGS. 2 and 3.

Figure 4A:
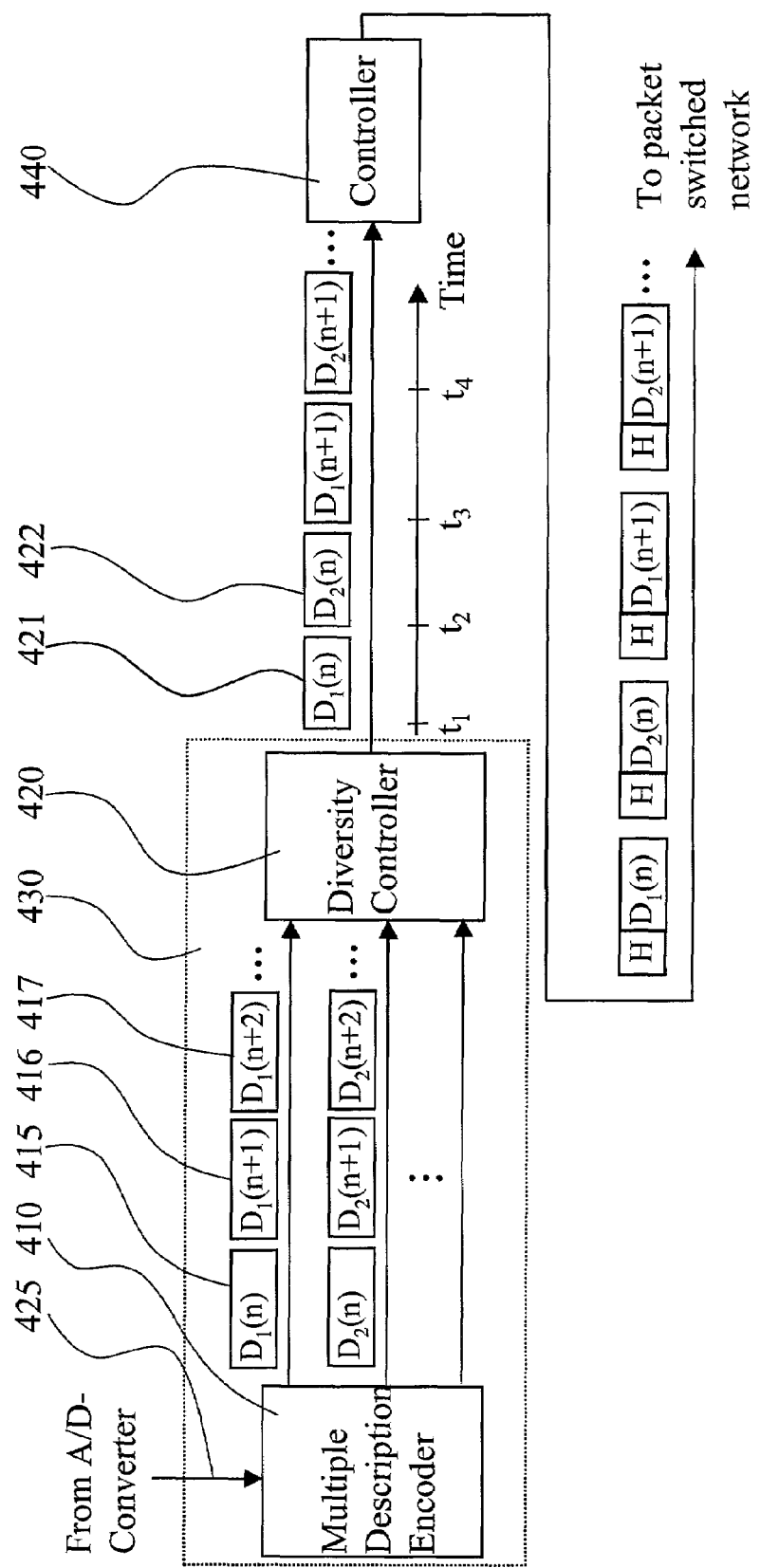
FIG. 4a shows an overview of the transmitting part of a system for transmission of sound over a packet switched network in accordance with an embodiment of the present invention.

In FIG. 4a, the Sound Encoder 430 at the transmitting end includes a Multiple Description Encoder 410 and a Diversity Controller 420. Correspondingly, the Sound Decoder 470 of FIG. 4b at the receiving end includes a Diversity Controller 450 and a Multiple Description Decoder 480.

Turning now to FIG. 4a, the Multiple Description Encoder 410 of the Sound Encoder 430 encodes a sampled sound signal 425 in two different ways, thereby obtaining two different bitstream representations, i.e. two different descriptions, of the sound signal. As previously described, each description has its own set of quantization levels, achieved, for example, by shifting the quantization levels of one description with half a quantization step. Correspondingly, if three descriptions were to be provided, the quantization levels of the second description would be shifted with a third step with respect to the first description, and the third description with a third step with respect to the second description. Thus, as indicated in FIG. 4a, the sound signal may be encoded using more than two descriptions without departing from the scope of the present invention. However, for ease of description, only two signal descriptions will be used in the herein disclosed embodiments of the invention.

Each description provides a segment description of an encoded sound signal segment of the sound signal. The different segment descriptions of the same sound segment are transmitted in respective packets to the Diversity Controller 420. In FIG. 4a, two descriptions have been indicated, $D_1$ and $D_2$. The consecutive segments n, n+1, n+2, and so on, are represented by description $D_1$ as segment descriptions $D_1(n)$, $D_1(n+1)$, $D_1(n+2)$ . . . , which segment descriptions are transferred in respective consecutive data packets 415, 416, 417 from the Multiple Description Encoder 410 to the Diversity Controller 420. Correspondingly, the same segments are also represented as segment descriptions $D_2(n)$, $D_2(n+1)$, $D_2(n+2)$ . . . by description $D_2$ and are also transferred in respective data packets to the Diversity Controller. Thus, each sound segment of the sound signal 425 is represented by one segment description of each description, for example in FIG. 4a sound segment n+1 is represented by segment description $D_1(n+1)$ of description $D_1$ and by segment description $D_2(n+1)$ of description $D_2$.

The Diversity Controller 420 dispatches the packets received from the Multiple Description Encoder 410 in accordance with the diversity scheme used. In FIG. 4a the Diversity Controller 420 sequences each segment description of one sound segment in separate packets. The packets containing different segment descriptions of the same sound segment are transferred to the Controller 440 at different time instances. For example, as indicated in FIG. 4*a*, the two segment descriptions $D_1(n)$ and $D_2(n)$ of sound segment n is delivered to the Controller 440 in separate packets 421 and 422 at different points of time $t_1$ and $t_2$. Thus, a delay of $t_2-t_1$ is introduced to create time diversity. A typical delay $t_2-t_1$ that could be used, in connection with typical sound segment lengths of 20 ms, is 10 ms. Upon reception of a packet from the Diversity Controller 420, the Controller 440 formats the packet, such as adding sequencing and destination address information, for immediate transmission on the packet switched network. Thus, the Controller 440 adds a header, H, with information to each packet. In the case of IPv4 transport using UDP (User Datagram Protocol) and RTP (Real Time Protocol), the header size is 320 bits. For a typical speech segment length of 20 ms, this leads to 320 bits per 20 ms, i.e. to 16 kbit/s for the headers of each description used. If each speech segment is represented by two segment descriptions, the headers of the packets transferring the segment descriptions will together require a bit rate of 2*16=32 kbit/s. This can be compared to the bit rate of 64 kbit/s for standard PCM (Pulse Code Modulated) telephony. Consequently, the overhead bit rate will be 50% (32 divided with 64) of the payload rate.

Figure 4B:
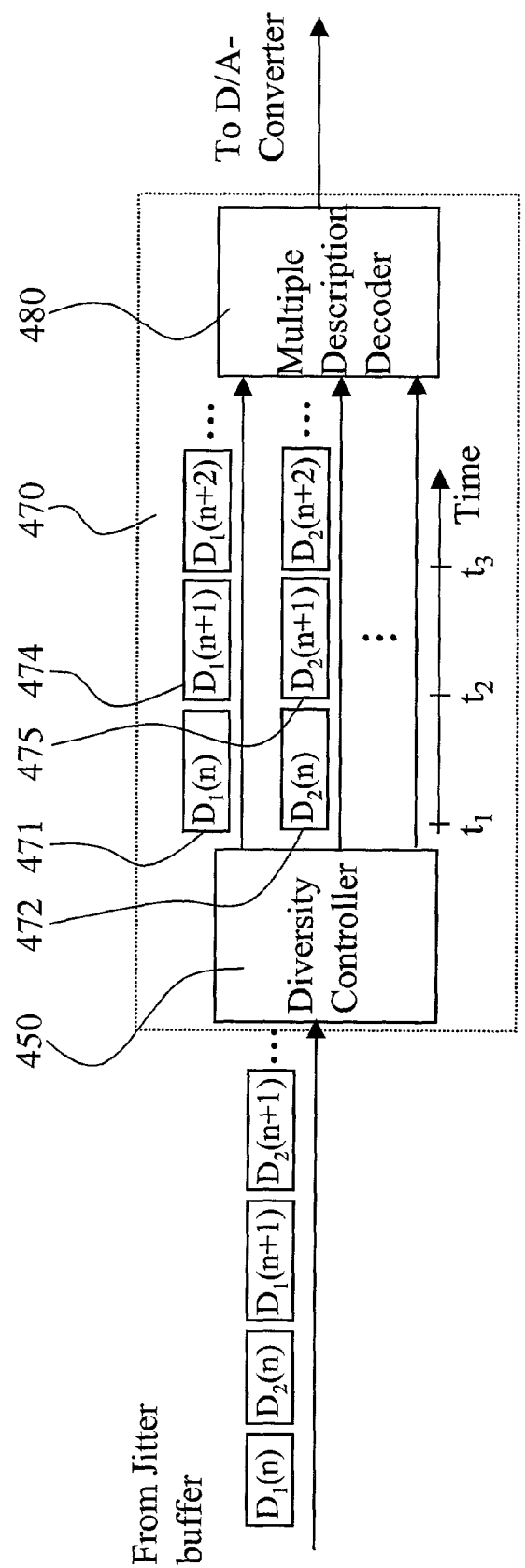

As previously described with reference to FIG. 3, packets are received at the receiver end by a Controller 350. The Controller removes header information and transfers the packets to the Jitter buffer 360, which in turn transfers the packets to the Sound Decoder 370. Turning now to FIG. 4*b*, the Diversity Controller 450 of the Sound Decoder 470 receives the packets with the different segment descriptions from a jitter buffer. The Diversity Controller then schedules the different segment descriptions of the same sound segment for transfer to the Multiple Description Decoder 480 at the same time. Thus, as illustrated in the FIG. 4*b*, the Multiple Description Decoder 480 will, for example, receive both packets 471 and 472 with respective segment descriptions $D_1(n)$ and $D_2(n)$ of sound segment n at the same time, and then both packets 474 and 475 with respective segment descriptions $D_1(n+1)$ and $D_2(n+1)$ of sound segment n+1, and so on. The Multiple Description Decoder 480 will for each sound segment extract the joint information from the different packets and decode the sound signal segment for transfer to a D/A-converter. If, for example, segment description $D_1(n)$ did not arrive at the receiver end, or arrived too late, the Diversity Controller 450 will only schedule $D_2(n)$ (if two descriptions are used) to the Multiple Description Decoder 480, which then will decode sound segment n of the sound signal with adequate quality from the single segment description $D_2(n)$ received.

Figure 5:
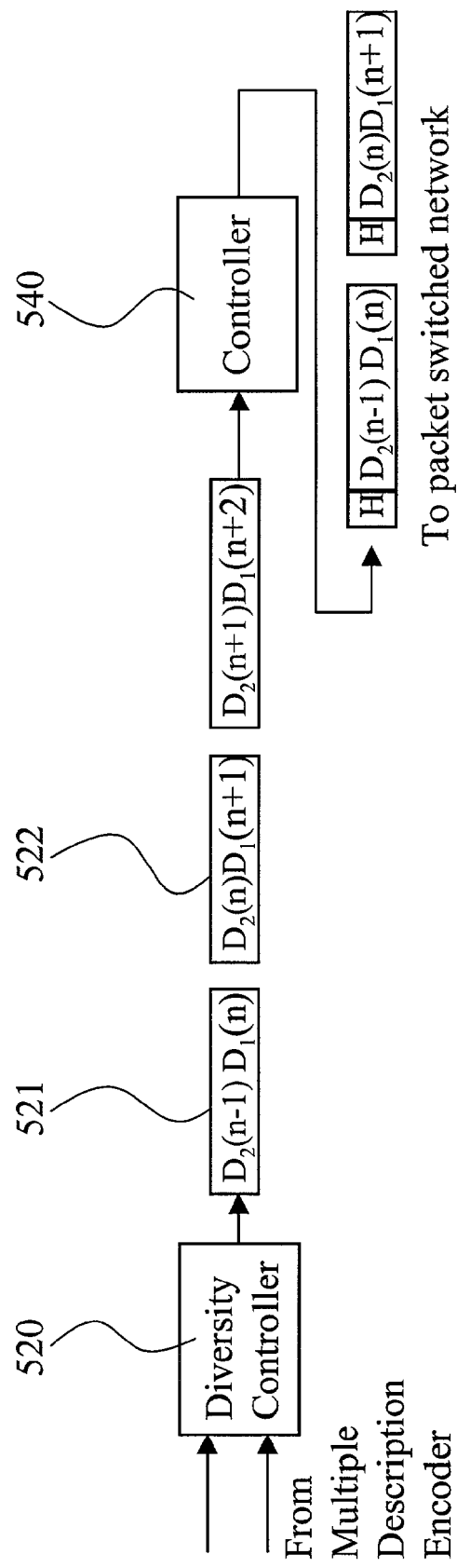
FIG. 5 shows an overview of the transmitting part of a system for transmission of sound over a packet switched network in accordance with another embodiment of the present invention.

In FIG. 5 another embodiment of the present invention is shown. This embodiment differs from the one previously described with reference to FIGS. 4*a* and 4*b* with respect to the organization of segment descriptions in the packets transferred by the packet switched network. Thus, the difference lies in the packet assembling/disassembling performed at the transmitting/receiving end by the Diversity Controller of the Sound Encoder/Decoder 430, 470. This difference will now be described below.

As described with reference to FIGS. 4*a* and 4*b*, the overhead resulting from the headers of the different packets transferring different segment descriptions of the same sound segment is quite extensive. To alleviate this, segment descriptions of different descriptions and relating to different sound segments are grouped together in the same packet before transmission of the packet over the packet switched network. As shown in FIG. 5 the Diversity Controller 520 of the Sound Encoder 430 at the transmitting end groups two individual segment descriptions of two consecutive sound segments together in each packet. The two segment descriptions of a packet belong to respective descriptions of the sound signal. For example, one packet will contain segment description $D_2(n-1)$ of sound segment n-1 and segment description $D_1(n)$ of sound segment n. The Controller 540 will as previously described add header information to each packet before transmitting the packet including the two segment descriptions over the packet switched network.

Thus, just as in the embodiment of FIG. 4, the Diversity Controller 520 of this embodiment will sequence each segment description of a sound segment in separate packets, and, as in the embodiment of FIG. 4, the packets containing different segment descriptions of the same sound segment will be transferred to the Controller 540 at different time instances. In FIG. 5, the two segment descriptions $D_2(n)$ and $D_1(n+1)$ of sound segment n and n+1 are delivered to the Controller 540 in packet 522. Thus, segment n+1 must have been encoded before segment description $D_2(n)$ can be transferred to the controller. Segment description $D_1(n)$ on the other hand was transferred in a previous packet 521 to the controller. If a sound segment is 20 ms, the transfer of $D_2(n)$ must be delayed with 20 ms compared with the transfer of $D_1(n)$ since $D_2(n)$ is to be scheduled in the same packet 522 as $D_1(n+1)$. Thus, this scheme will automatically provide time diversity since different segment descriptions of the same sound segment will be transferred to the Controller 540 with a 20 ms interval (given a sound segment length of 20 ms). Thus, in comparison with the embodiment of FIG. 4, an additional delay between the two segment descriptions of the same sound segment is automatically introduced with this scheme of assembling packets with several segment descriptions. This additional delay between segment descriptions provides an additional time diversity advantage and can be compensated for later in the transmission chain, for example, by having lower delay settings in the jitter buffer at the receiving end.

Moreover, the amount of payload data in one packet according to this embodiment corresponds to the total amount of data generated from one sound segment, therefore, the overhead information is not increased when creating time diversity with this scheme.

In correspondence with what has been described above, the Diversity Controller at the receiver end in this embodiment will divide the received packets in their segment description parts before transferring the segment descriptions to the Multiple Description Decoder, in correspondence with what has been shown in FIG. 4*b*.

The effect of the time diversity scheme referred to by FIG. 5 is again that if one packet is lost or delayed during transmission over the packet switched network, descriptions of all sound segments will still be available at the receiver end and no sound segment loss will be perceived. In FIG. 6*a*, the scenario of packet loss is illustrated. When packet 603 containing segment description $D_2(n+1)$ and $D_1(n+2)$ is lost, sound segment n+1 will still be represented by the segment description $D_1(n+1)$ in the previous packet 602 and n+2 by the segment description $D_2(n+2)$ in the later packet 604. In FIG. 6*b*, the scenario when two consecutive packets are lost is illustrated. In this case, when packets 611 and 612 are lost, no representation of segment n+2 will be available and segments n+1 and n+3 will be represented by one segment description each in packets 610 and 613, respectively. Consequently, the diversity scheme in this example of the embodiment can repair the loss of one packet by always having one description available. Loss of two consecutive packets will lead to loss of all the information about one of the sound signal segments. In the general case however, with more than two segment descriptions of a sound signal segment and with corresponding grouping of more than two segment descriptions in one packet, the diversity benefits will be larger at the price of increased delay.

According to another embodiment of the invention lossless encoding/decoding is added to the transmission system for transmitting and receiving a digitized sound signal over a packet switched network. This is illustrated in FIGS. 7a and 7b. In FIG. 7a, each description of the Multiple Description Encoder 710 is losslessly encoded before being received by the Diversity Controller 720 of the Sound Encoder 730. Correspondingly, in FIG. 7b, each segment description from the Diversity Controller 750 of a Sound Decoder 770 is losslessly decoded before being received by the Multiple Description Decoder 780 via a Combiner 775. The Combiner is included in the Sound Decoder 770 in order to make sure that the different segment descriptions of the same sound segment reach the Multiple Description Decoder 780 at the same time. The lossless encoding/decoding of the segment descriptions is performed by Lossless Encoders 715, 716, 717 and Lossless Decoders 760, 761, 762 at the transmitting end and at the receiving end, respectively.

The general purpose of lossless encoding is to find a less bit-consuming way to describe the data without loosing any information. The Lossless Encoder uses statistical information about the input signal to reduce the average bit rate. For example, this is performed in such way that the code words are ordered in a table after how often they occur in the input signal. The most common code words are then represented with fewer bits than the rest of the code words. An example of a Lossless Encoder known in the art that uses this idea is the Huffman coder.

Lossless encoding only works well in networks without bit errors in the received data. The code words used in connection with lossless encoding are of different length, and if a bit error occurs it is not possible to know when a code word ends and a new begin. Thus, a single bit error does not only introduce an error in the decoding of the current code word, but in the whole block of data. When the packet switched network is an IP (Internet Protocol)-network, all damaged data packets are automatically discarded. Thus, in such a packet switched network there will be no bit errors in data packets received at the receiver end. Therefore, lossless encoding, such as scalar or block Huffman coding, are suitable for use for independent compression of each of the multiple segment descriptions of a sound signal segment according to the present invention. Moreover, since the bit rate of the sound signal is increased when multiple descriptions of the sound are used, compression of the segment descriptions are desired.

The Lossless Encoders/Decoders of the embodiment of FIGS. 7a and 7b each includes a table which is created to include all possible code words and their bit representation. A simple table look-up is performed to losslessly encode the sound segment descriptions before feeding them to the Diversity Controller 720 at the transmitting end. Correspondingly, at the receiver end, the sound segment descriptions from the Diversity Controller 750 are losslessly decoded before being fed to the Multiple Description Decoder 780.

With reference to FIGS. 8a and 8b the use of lossless encoding together with a Multiple Description Encoder and lossless decoding together with a Multiple Description Decoder, respectively, is further illustrated in accordance with an embodiment of the invention. FIGS. 8a and 8b illustrate the design and operation of the Multiple Description Encoder/Decoder with respect to one of the descriptions with which it operates. Thus, Quantizer 800 in FIG. 8a represents the quantizer for one description and a respective set of all the elements shown in FIG. 8a will be present in a Multiple Description Encoder for each description used. Correspondingly, a respective set of all the elements shown in FIG. 8b will be present in a Multiple Description Decoder for each description used.

Referring to FIG. 8a, the Multiple Description Encoder includes, for each description which it is arranged to generate, a first Quantizer 800, a De-quantizer 810, a Delay block 820, a Predictor 830, a second Quantizer 840 and a Lossless Encoder 850. The De-quantizer 810 and the second Quantizer 840 are depicted with dashed lines since they are not necessary elements of this embodiment. The use of these optional elements will be described later in an alternative embodiment.

Correspondingly, in FIG. 8b, the Multiple Description Decoder includes, for each description which it is arranged to decode, a Lossless Decoder 855, a Quantizer 870, a Predictor 880, a Delay block 890 and De-quantizer 860 and 863. The Quantizer 870 and the De-quantizer 863 are depicted with dashed lines since they are not necessary elements of this embodiment. The use of these optional elements will be described later in an alternative embodiment.

Each Lossless Encoder 850 and each Lossless Decoder 855 of the embodiment of FIGS. 8a and 8b includes a table which is created to include all possible code words and their bit representation. Table look-ups are performed to losslessly encode a sound segment with digital sound samples quantized by the Quantizer 800 before being transmitted as code words over the packet network. Correspondingly, at the receiver end, the code words of an encoded sound segment with digital sound samples are losslessly decoded to quantized digital sound samples which then are de-quantized by De-quantizer 860 to a reconstructed sound segment of digital sound samples.

In FIG. 8a digital sound samples of a digitized sound signal received from the A/D-converter are quantized by quantizer 800 into quantized digital sound samples. For each quantized digital sample a prediction sample is generated by Predictor 830 based on one or more previously quantized digital samples. The predictor 830 generates a quantization index for the prediction sample based on the quantization levels, i.e. quantization indices or quantization values, for these previously quantized digital samples, which levels have been outputted by the Quantizer 800 and delayed by the Delay block 820. The quantization index of a prediction sample is then transferred to a Subtracter 845 where it is subtracted from the quantization index of a current quantized digital sample outputted from the Quantizer 800. The result from the Subtracter 845, i.e. the difference between the quantization index of the prediction sample and the quantization index of the current quantized digital sample, is transferred to the Lossless Encoder 850. The Lossless Encoder encodes the current quantized digital sample by using the index difference received from the Subtracter 845 as an entry in a look-up table for outputting a corresponding code word. The code words of a complete encoded sound segment with quantized digital samples are eventually assembled to a separate packet which is transferred to a Diversity Controller. Alternatively, each code word of an encoded sound segment is collected by the Diversity Controller and then assembled to a separate packet for the encoded sound segment. A Controller adds header information before transmitting the data packet over a packet switched network.

In FIG. 8b packets with code words are received from a Diversity Controller by the Lossless Decoder 855. Each code word is used by the Lossless Decoder to select an entry in a look-up table for outputting a corresponding index difference which in turn corresponds to a quantized digital sample. For each quantized digital sample a prediction sample is generated by Predictor 880 based on one or more previous quantized digital samples. Predictor 880 at the receiving end is configured to operate in the same way as Predictor 830 at the transmitting end. The configuration of these predictors is typically such that the predictor state is zero when generating prediction samples corresponding to the initial quantized digital samples of a digitized sound signal. In the same way as at the transmitting end, predictor 880 generates a quantization index based on the quantization levels, i.e. quantization indices or quantization values, of previously quantized digital samples, which levels implicitly have been outputted by the Lossless Decoder 855 and delayed by the Delay block 890. The quantization index of the generated prediction sample is then transferred to an Adder 865 where it is added to the index difference outputted from the Lossless Decoder 855. The result from the Adder 865, i.e. the sum of the quantization index of the prediction sample and the index difference, is transferred to the De-quantizer 860 where it is de-quantized before being transferred to a D/A-converter.

In alternative embodiments, the Multiple Description Encoder includes the De-quantizer 810 and/or the second Quantizer 840 as depicted in FIG. 8a. Correspondingly, the Multiple Description Decoder in accordance with these alternative embodiments includes the Quantizer 870 and/or the De-quantizer 863.

Using De-quantizer 810 and 863 quantization values of quantized digital samples will be inputted to the Predictor 830 and 880 rather than quantization indices and the Predictors will generate prediction samples based on values rather than indices.

If the Predictors 830 and 880 do not include quantization tables for outputting quantization levels, such as indices, of the generated prediction samples, the Multiple Description Encoder/Decoder will include Quantizers 840, 870 for providing quantization levels, for example indices, of the generated prediction samples. In this way the Subtracter 845 and the Adder 865 will still be fed with the quantization levels of the prediction samples. Moreover, using the Quantizers 840 and 870 it is ascertained that the quantization levels of the generated prediction samples will be valid levels belonging to a predefined set of levels, and not levels falling between different valid quantization levels.

Figure 9A:
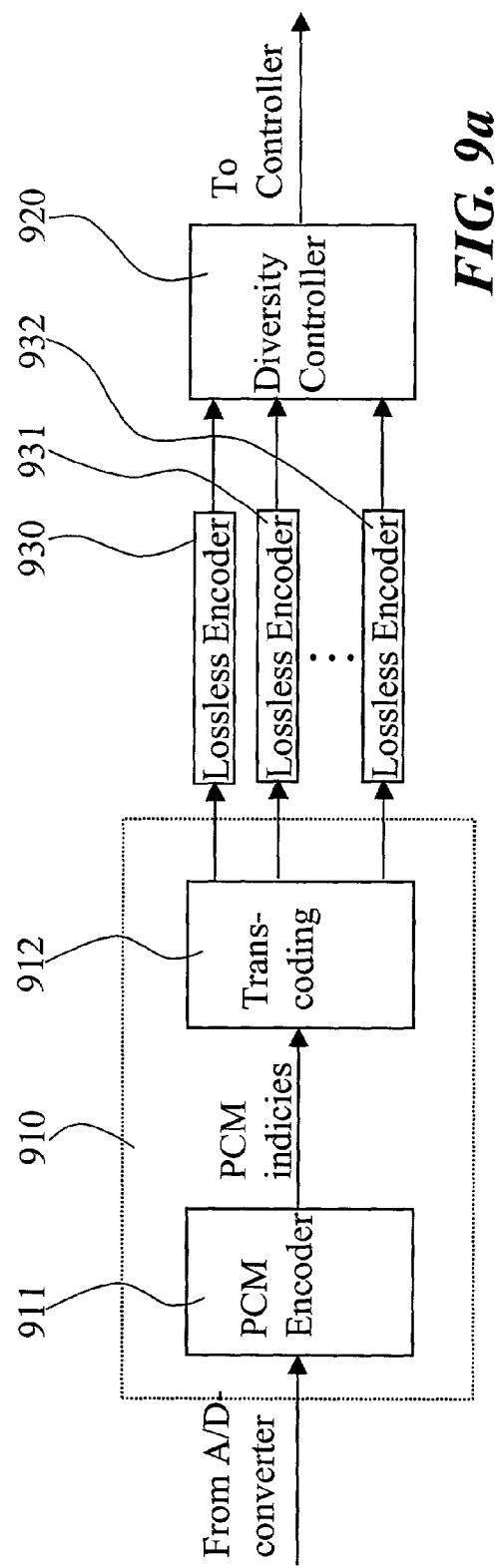
FIGS. 9a and 9b show overviews of the transmitting part and the receiving part, respectively, of a system for transmission of sound over a packet switched network in accordance with a further embodiment of the present invention.
Figure 9B:
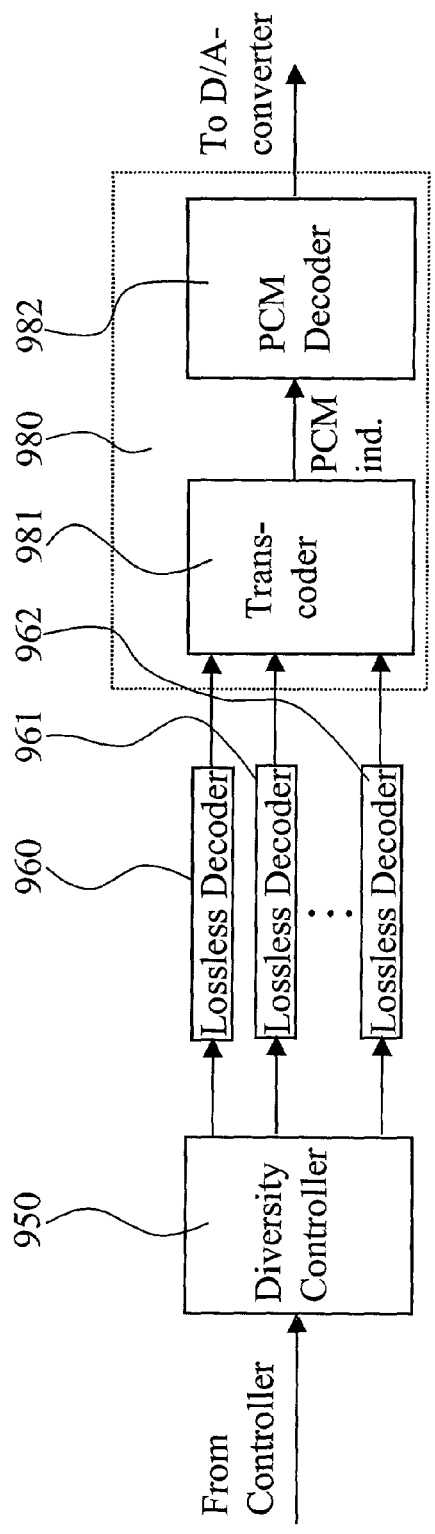

According to the invention, in order to avoid error propagation, a generated prediction sample corresponding to a digital sample of one sound segment with digital sound samples should not be based on digital samples of a previous sound segment. In accordance with an embodiment, this is achieved by setting a predictor state of Predictor 830 to zero before a new sound segment with quantized digital samples is encoded. Correspondingly, in the Multiple Description Decoder at the receiving end, the predictor state of Predictor 880 is set to zero before decoding a new sound segment with quantized digital samples. As an alternative to setting the predictor state to zero, state information can be included in each sound segment of digital samples. Another embodiment of the invention is described with reference to FIGS. 9a and 9b. In this embodiment the Multiple Description Encoder 910 of the Sound Encoder 730 consists of an ordinary PCM Encoder 911 followed by a Transcoder 912. Thus, the digitized sound signal received by the Sound Encoder 730 from the A/D converter is encoded using an ordinary PCM Encoder 911. The obtained PCM bitstream is then transcoded, i.e. translated, into several bitstreams by the Transcoder 912, after which each bitstream gives a coarse representation of the PCM signal. The corresponding Multiple Description Decoder is shown in FIG. 9b. The Multiple Description Decoder 980 includes a Transcoder 981 for transcoding received multiple bitstream descriptions to a single PCM bitstream. This PCM bitstream is then decoded by an ordinary PCM Decoder 982 before being transferred to a D/A-converter. The method of transcoding, or translating is exemplified below where one 64 kbit/s PCM bitstream is transcoded into two bitstreams which provide multiple descriptions of the PCM signal.

A standard 64 kbit/s PCM Encoder using $\mu$-law log-compression encodes the samples using 8 bits/sample. This gives 256 different code words, but the quantizer only consists of 255 different levels. The zero-level is represented by two different code words to simplify the implementation in hardware. According to the embodiment, each quantization level is represented by an integer index, starting with zero for the most negative level and up to 254 for the highest level. The first of the two bitstreams is achieved by removing the least significant bit of each of the integer indices. This new index represents a quantization level in the first of the two coarse quantizers. The second bitstream is achieved by adding one to each index before removing the least significant bit. Thus, two 7-bit representations are achieved from the original 8-bit PCM representation. Decoding of the two representations can either be performed on each individual representation, in case of packet loss, or on the two representations in which case the original PCM signal is reconstructed. The decoding is simply a transcoding back into the PCM indices, followed by table look-up.

Alternatively, the PCM Encoder 910 is a standard 64 kbit/s PCM Encoder using A-law log-compression. In this case the number of levels in the quantizer is 256, which is one more than in a $\mu$-law coder. To represent these 256 levels using two new quantization grids, and be able to fully reconstruct the signal, one grid with 128 levels and one with 129 levels is needed. It would be desired to use two 7-bit grids like in the $\mu$-law case, however the problem with the extra quantization level has to be solved. According to the invention each quantization level is represented by an integer index, starting with zero for the most negative level and up to 255 for the highest level. The exact same rule as in the $\mu$-law case is used to form the new indices, except when representing index number 255. The index number 255 is represented with index number 126 for the first quantizer and index number 127 for the second instead of 128 and 127, which would be obtained if the rule would be followed. The decoder has to check this index representation when transcoding the two bitstreams into the A-law PCM bitstream. If only the first of the two descriptions is received after transmission, and the $255^{th}$ index was encoded, the decoder will introduce a quantization error that is a little higher than for the other indices.

An encoded PCM signal includes a high degree of redundancy. Therefore, it is particularly advantageous to combine this embodiment with PCM encoding/decoding with lossless encoding/decoding of the multiple descriptions derived from a PCM sound signal. As shown in FIGS. 9a and 9b, lossless encoding/decoding of the descriptions is performed by Lossless Encoders 930, 931, 932 and Lossless Decoders 960, 961, 962 at the transmitting end and receiving end, respectively.

If the digitized sound signal received by the Sound Encoder already is represented as a 64 kbit/s PCM bitstream, and if the Sound Decoder at the receiving part should output a 64 kbit/s PCM bitstream, the PCM Encoder at the transmitting part and the PCM Decoder at the receiving part will not be needed. In this case the Multiple Description Encoder of the present invention receives the PCM bitstream and converts the PCM indices to the 0 to 254 representation described above. This representation is fed directly to the Transcoder, which transcodes the bitstream into two new bitstreams using the simple rules given above. At the receiver end of the system the information in the received packets are collected by the Diversity Controller. If all packets arrive the Transcoder merges and translates the information from the multiple descriptions back into the original PCM bitstream. If some packets are lost the original bitstream cannot be exactly reconstructed, but a good approximation is obtained from the descriptions that did arrive.

Although the invention has been described above by way of example with reference to different embodiments thereof, it will be appreciated that various modifications and changes can be made without departing from the scope of the invention as defined in the appended claims.

What is claimed is:

1. A method of encoding a digitized sound signal and transmitting the coded digitized sound signal over a packet switched network with diversity, the method comprising steps of:
    encoding said digitized sound signal and its sound segments into at least two different descriptions with respective segment descriptions, each description being a representation of the sound signal with a respective set of quantization levels, wherein each sound segment is represented by at least two different segment descriptions; and
    transmitting, for each one of said sound segments, each of said at least two different segment descriptions in separate data packets at different points of time, wherein a predefined time interval is introduced between the transmissions of two different segment descriptions of a sound segment.

2. The method of encoding a digitized sound signal and transmitting the coded digitized sound signal over the packet switched network with diversity as recited in claim 1, further comprising a step of grouping several segment descriptions of several different sound segments together in one and the same data packet, wherein each segment description of the data packet describes a sound segment in accordance with a corresponding sound signal description.

3. The method of encoding a digitized sound signal and transmitting the coded digitized sound signal over the packet switched network with diversity as recited in claim 1, further comprising a step of grouping a first segment description of a first sound segment with a second segment description of a second sound segment together in one and the same data packet, wherein each segment description of the data packet describes a sound segment in accordance with a corresponding sound signal description.

4. The method of encoding a digitized sound signal and transmitting the coded digitized sound signal over the packet switched network with diversity as recited in claim 3, wherein said first sound segment and said second sound segment are two consecutive sound segments of said digitized sound signal.

5. The method of encoding a digitized sound signal and transmitting the coded digitized sound signal over the packet switched network with diversity as recited in claim 1, wherein a data packet comprising a segment description of a sound segment is transmitted over a path in said packet switched network which path is different from that of a packet including another segment description of the same sound segment.

6. The method of encoding a digitized sound signal and transmitting the coded digitized sound signal over a packet switched network with diversity as recited in claim 1, wherein said digitized sound signal is a PCM encoded bitstream.

7. The method of encoding a digitized sound signal and transmitting the coded digitized sound signal over the packet switched network with diversity as recited in claim 6, wherein said encoding step comprises a step of transcoding an n-bit PCM representation bitstream to at least two representation bitstreams, each of the at least two representation bitstreams being represented by fewer than n bits and being a description of the sound signal with a respective set of quantization levels.

8. The method of encoding a digitized sound signal and transmitting the coded digitized sound signal over a packet switched network with diversity as recited in claim 1, wherein each segment description is subject to lossless encoding prior to being included in a data packet for transmission, the lossless encoding including compressing the segment description by exploiting redundancies in the encoded digitized sound signal.

9. The method of encoding a digitized sound signal and transmitting the coded digitized sound signal over the packet switched network with diversity as recited in claim 8, wherein said lossless encoding comprises steps of:
    quantizing digitized sound samples of the sound segment;
    generating prediction samples based on previous quantized digital sound samples of said sound segment; and
    lossless encoding the quantized digital sound samples based on the generating prediction samples step.

10. A method of receiving and decoding a coded digitized sound signal from a packet switched network utilizing diversity provided by the received packets, the method comprising steps of:
    waiting a predetermined time period for reception of at least two different packets, the packets including different segment descriptions for one and the same sound segment; and one of the following steps of:
        decoding said sound signal segment based on a merger of said different segment descriptions included by said at least two different packets, if said different segment description are received within said time period, and
    decoding said sound signal segment based on those, one or a merger of more than one, different segment descriptions that were received within said time period.

11. The method of receiving and decoding the coded digitized sound signal from the packet switched network utilizing the diversity provided by the received packets as recited in claim 10, wherein each received packet comprises several segment descriptions of several different sound segments grouped together, the method comprising a step of dividing successively received packets with respect to the included segment descriptions, thereby obtaining several different segment descriptions for each sound segment based on which said each sound segment is decoded.

12. The method of receiving and decoding the coded digitized sound signal from the packet switched network utilizing the diversity provided by the received packets as recited in claim 10, wherein said coded digitized sound signal is a PCM encoded bitstream.

13. The method of receiving and decoding the coded digitized sound signal from the packet switched network utilizing the diversity provided by the received packets as recited in claim 12, wherein the merger of two segment descriptions of the same sound signal segment involves transcoding at least two segment representations, each represented by fewer than n bits, to a single n-bit PCM representation of said same sound signal segment.

14. The method of receiving and decoding the coded digitized sound signal from the packet switched network utilizing the diversity provided by the received packets as recited in claim 10, wherein a received segment description is subject to lossless decoding prior to being merged with another segmented description of the same sound signal segment.

15. The method of receiving and decoding the coded digitized sound signal from the packet switched network utilizing the diversity provided by the received packets as recited in claim 14, wherein said lossless decoding comprises steps of:
lossless decoding code words of a received segment description into received quantization levels;
generating prediction samples based on previously received quantized digital sound samples of said digitized sound signal;
deriving, based on the generated prediction samples, received quantized digital sound samples of said digitized sound signal from said quantization levels; and
de-quantizing said received quantized digital sound samples into digitized sound samples of said digitized sound signal.

16. A computer readable medium having computer executable instructions for causing a digitized sound signal to be encoded and transmitted over a packet switched network in such way that diversity is provided, the computer executable instructions performing steps of:
encoding said digitized sound signal and its sound segments into at least two different descriptions with respective segment descriptions, each description being a representation of the sound signal with a respective set of quantization levels, wherein each sound segment is represented by at least two different segment descriptions; and
transmitting, for each one of said sound segments, each of said at least two different segment descriptions in separate data packets at different points of time, wherein a predefined time interval is introduced between the transmissions of two different segment descriptions of a sound segment.

17. A computer readable medium having computer executable instructions for causing a digitized sound signal from a packet switched network to be received and decoded in such way that the diversity provided by the received packets is utilized, the computer executable instructions performing steps of:
waiting a predetermined time period for reception of at least two different packets, the packets including different segment descriptions for one and the same sound segment; and one of the following steps of:
decoding said sound signal segment based on a merger of said different segment descriptions included by said at least two different packets, if said different segment description are received within said time period, and
decoding said sound signal segment based on those, one or a merger of more than one, different segment descriptions that were received within said time period.

18. A digitized sound signal embodied on a carrier wave for a packet switched network that provides diversity, wherein the digitized sound signal describes a sound segment, the digitized sound signal comprising:
a first segment description related to the sound segment;
a second segment description related to the sound segment;
a first data packet comprising the first segment description; and
a second data packet comprising the second segment description, wherein:
the first segment description is related to a first set of quantization levels,
the second segment description is related to a second set of quantization levels,
the first segment description is different from the second segment description, and
the first data packet is offset in time from the second data packet by a predetermined time interval.

19. The digitized sound signal embodied on the carrier wave for the packet switched network that provides diversity as recited in claim 18, wherein the first set of quantization levels is different from the second set of quantization levels.

20. The digitized sound signal embodied on the carrier wave for the packet switched network that provides diversity as recited in claim 18, wherein the first data packet is separated in time from the second data packet by a predetermined time period.

* * * * *

UNITED STATES PATENT AND TRADEMARK OFFICE
CERTIFICATE OF CORRECTION

PATENT NO. : 7,009,935 B2
DATED : March 7, 2006
INVENTOR(S) : Abrahamsson et al.

It is certified that error appears in the above-identified patent and that said Letters Patent is hereby corrected as shown below:

Column 17,
Line 21, "segmented" should read -- segment --.

Signed and Sealed this

Twenty-third Day of May, 2006

JON W. DUDAS
*Director of the United States Patent and Trademark Office*